United States Patent [19]

Rudmann

[11] 4,219,171
[45] Aug. 26, 1980

[54] DEVICE FOR COUPLING A FIRST VEHICLE TO A SECOND VEHICLE

[75] Inventor: Arthur A. Rudmann, Bowie, Md.

[73] Assignee: The United States of America as represented by the Administrator of the National Aeronautics and Space Administration, Washington, D.C.

[21] Appl. No.: 9,888

[22] Filed: Feb. 6, 1979

[51] Int. Cl.³ .............................................. B64G 1/64
[52] U.S. Cl. ................................... 244/161; 294/106; 414/1
[58] Field of Search ............... 244/161, 135 A, 158; 294/106, 115; 414/1, 4; 114/242, 249, 250; 280/504, 513

[56] References Cited

U.S. PATENT DOCUMENTS

| | | | |
|---|---|---|---|
| 2,199,588 | 5/1940 | Cobham et al. | 244/135 A |
| 3,753,536 | 8/1973 | White | 244/161 |
| 3,885,825 | 5/1975 | Amberg et al. | 294/115 |
| 4,018,409 | 4/1977 | Burch et al. | 244/161 |

*Primary Examiner*—Barry L. Kelmachter
*Attorney, Agent, or Firm*—Robert D. Marchant; John R. Manning; John O. Tresansky

[57] ABSTRACT

A device is disclosed, carried by a first vehicle such as an orbiting space shuttle, having a plurality of contact members for engaging and holding an annular ring on a second vehicle such as an orbiting payload. The contact members are connected to manipulator arms which are mounted at a fulcrum point and which are moved by an iris-type mechanism. Movement of the manipulator arms causes the contact members to grasp or release the annular ring. Bumper devices are provided to axially align the annular ring and draw the contact members into engagement therewith.

15 Claims, 18 Drawing Figures

U.S. Patent   Aug. 26, 1980   Sheet 1 of 4   4,219,171
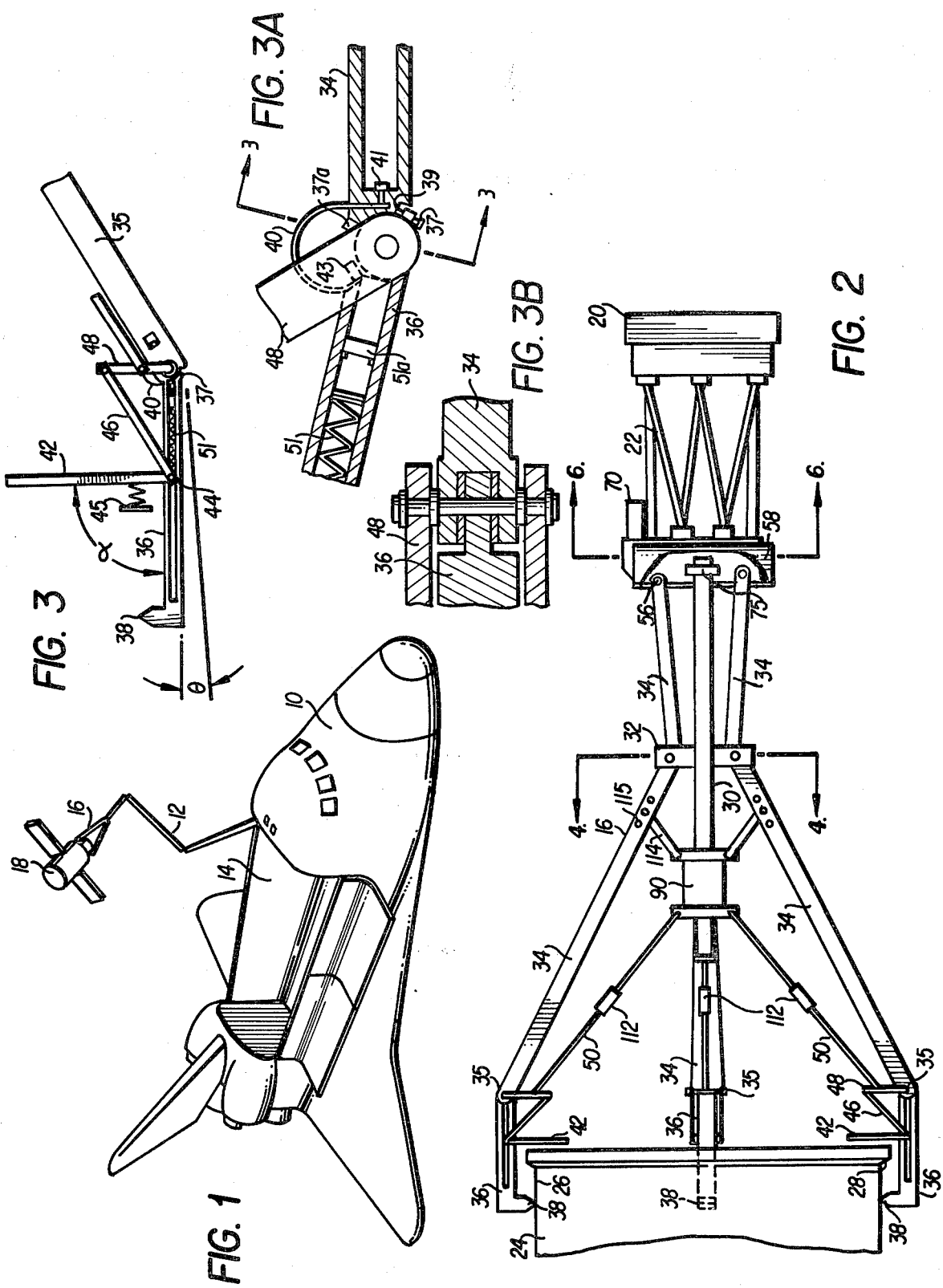

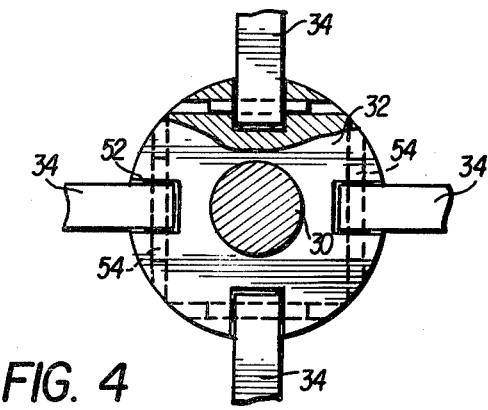
FIG. 4
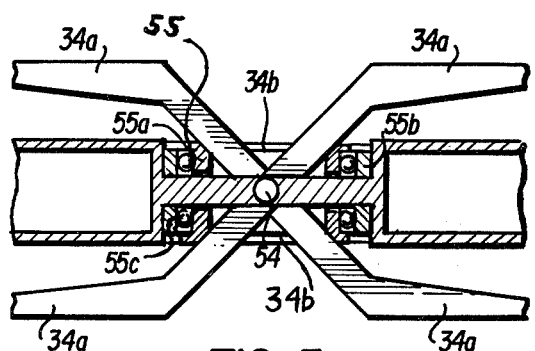
FIG. 5
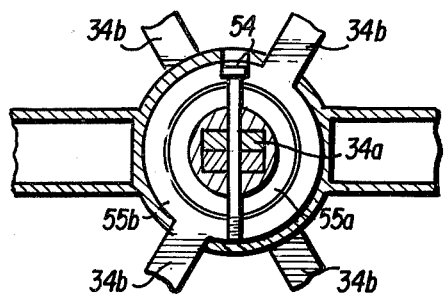
FIG. 5A
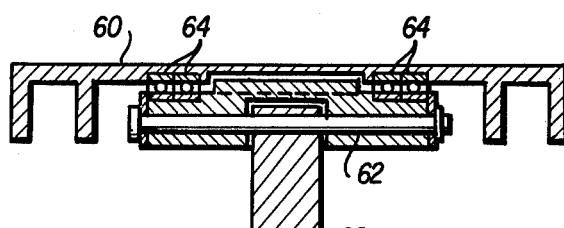
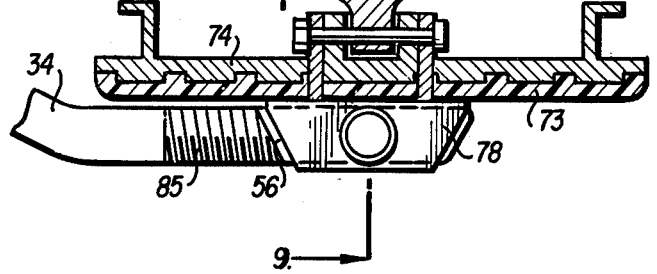
FIG. 7
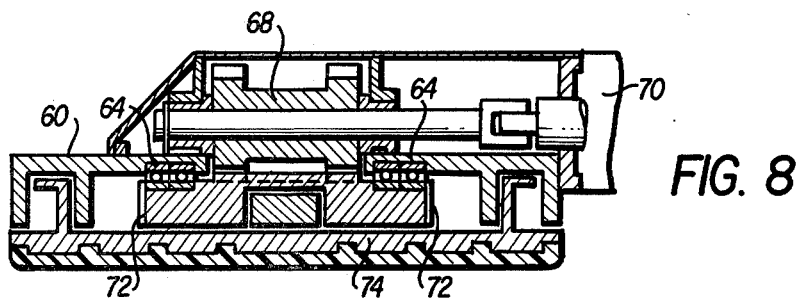
FIG. 8

DEVICE FOR COUPLING A FIRST VEHICLE TO A SECOND VEHICLE

ORIGIN OF THE INVENTION

The invention described herein was made by an employee of the United States Government and may be manufactured and used by or for the Government of the United States of America for governmental purposes without the payment of any royalties thereon or therefore.

RELATED APPLICATIONS

This application is related to my co-pending application Ser. No. 907,436, filed May 19, 1978 now U.S. Pat. No. 4,173,324.

SUMMARY OF THE INVENTION

This invention relates to coupling devices and more specifically to a device for attachment to the end of an arm of a remote manipulator system carried by a first space vehicle for coupling thereto a payload in the form of an orbiting satellite or other space vehicle. The device is capable of securely coupling the device to the payload to enable the payload to be accurately deployed in space from the cargo bay of a delivery vehicle as well as to be captured in space and returned to the bay of the delivery vehicle. One type of prior art device which operates on the end of a manipulator arm of a delivery vehicle utilizes a pair of jaw members the inside surface of which is used to grasp the object such as an orbiting satellite or part thereof and the outside surface of which is used to interlock with a receptacle carried by the object into which the jaws are inserted. Devices of this nature may operate satisfactorily if the receptacle carried by the object is in substantial alignment with the jaw so that it can be inserted sufficiently for interlocking purposes. However, such instances of substantial alignment between objects such as satellites, vehicles and the like orbiting in space are rare. In addition to mechanical linkages of the types described, there are known capture systems which utilize wire cables or other means which become taut at the final stage of expected capture. No coupling device has been found in the prior art capable of grasping, aligning and firmly coupling with an adaptor separation ring of a payload in the form of a satellite or other object which is in substantial misalignment and/or rotating with respect to the coupling device.

Accordingly, it is an important object of the present invention to provide a device capable of firmly coupling an orbital payload to the remote manipulator system of an orbital vehicle for deploying same in space or capturing same from space.

It is another important object of the present invention to provide a coupling device for the remote manipulator system of an orbital vehicle which is capable of grasping and holding a substantially misaligned adaptor ring or an orbiting vehicle and aligning same prior to effecting secure engagement therebetween.

It is another important object of the present invention to provide a coupling device for a remote manipulator system of an orbital vehicle which is small and more compact.

It is another important object of the present invention to provide a coupling device which is capable of rotating to either match the rotational speed of the annular ring on the orbiting payload prior to contact therewith or to rotate the payload to a desired speed before placing it in a desired orbit.

These and other objects and advantages of the invention will become apparent upon reference to the following specification, attendant claims and drawing.

Briefly, these and other objects are attained by a coupling device which is secured to the end of an arm of a remote manipulator system carried by a first vehicle such as an orbiting space shuttle for engaging and holding an annular ring on a second vehicle such as an orbital payload. The device includes a plurality of contact members which are operatively connected to manipulating arms which in turn are mounted relative to each other at a fulcrum point. The other ends of the manipulator arms are operatively connected at their other ends to an iris-type adjusting mechanism. The adjusting mechanism has as many blades as there are manipulating arms and means are provided on each blade to connect it to the end of one of the manipulating arms. Rotation of the adjusting mechanism causes the ends of the arms connected thereto to move either toward or away from each other thereby causing the contact members to move away from or toward the annular ring. Bumper means are also provided slidably mounted within the contact members for engaging the annular ring and rotating it relative to the contact members if it is out of alignment with the coupling device and subsequently drawing the contact members into firm engagement with the annular ring. This rigid coupling results in a stable composite structure which can be easily maneuvered by the remainder of the manipulator system. The actuating device for the bumpers is a spring loaded latch mechanism which is cocked by movement of the manipulator arms and which is released to provide a slow, constant movement of the bumper means toward and against the annular ring. A damper means is associated with the latch mechanism to ensure the desired movement of the bumper arms.

BRIEF DESCRIPTION OF THE DRAWINGS

FIG. 1 is a perspective view of two orbital vehicles joined by the coupling device of the present invention;

FIG. 2 is a side elevational view of the coupling device of the present invention connected to an end of a remote manipulator system of a orbital vehicle and grasping the adaptor ring of an orbital payload;

FIG. 3 is a plan view of the contact member and manipulator arm;

FIG. 3A is a plan view in partial cross-section of the contact member as it is connected to the end of a manipulator arm of the coupling device;

FIG. 3B is a cross-sectional view taken along the lines 3—3 of FIG. 3A;

FIG. 4 is a cross-sectional view with partial cut-away taken along the lines 4—4 of FIG. 2;

FIG. 5 is a side view of another embodiment of the manipulator arms and fulcrum of the present invention;

FIG. 5a is a plan view of the embodiment of FIG. 5;

FIG. 7 is a cross-sectional view taken along the lines 7—7 of FIG. 6;

FIG. 8 is a cross-sectional view taken along the lines 8—8 of FIG. 6;

DETAILED DESCRIPTION OF THE PREFERRED EMBODIMENT

Figure 6:
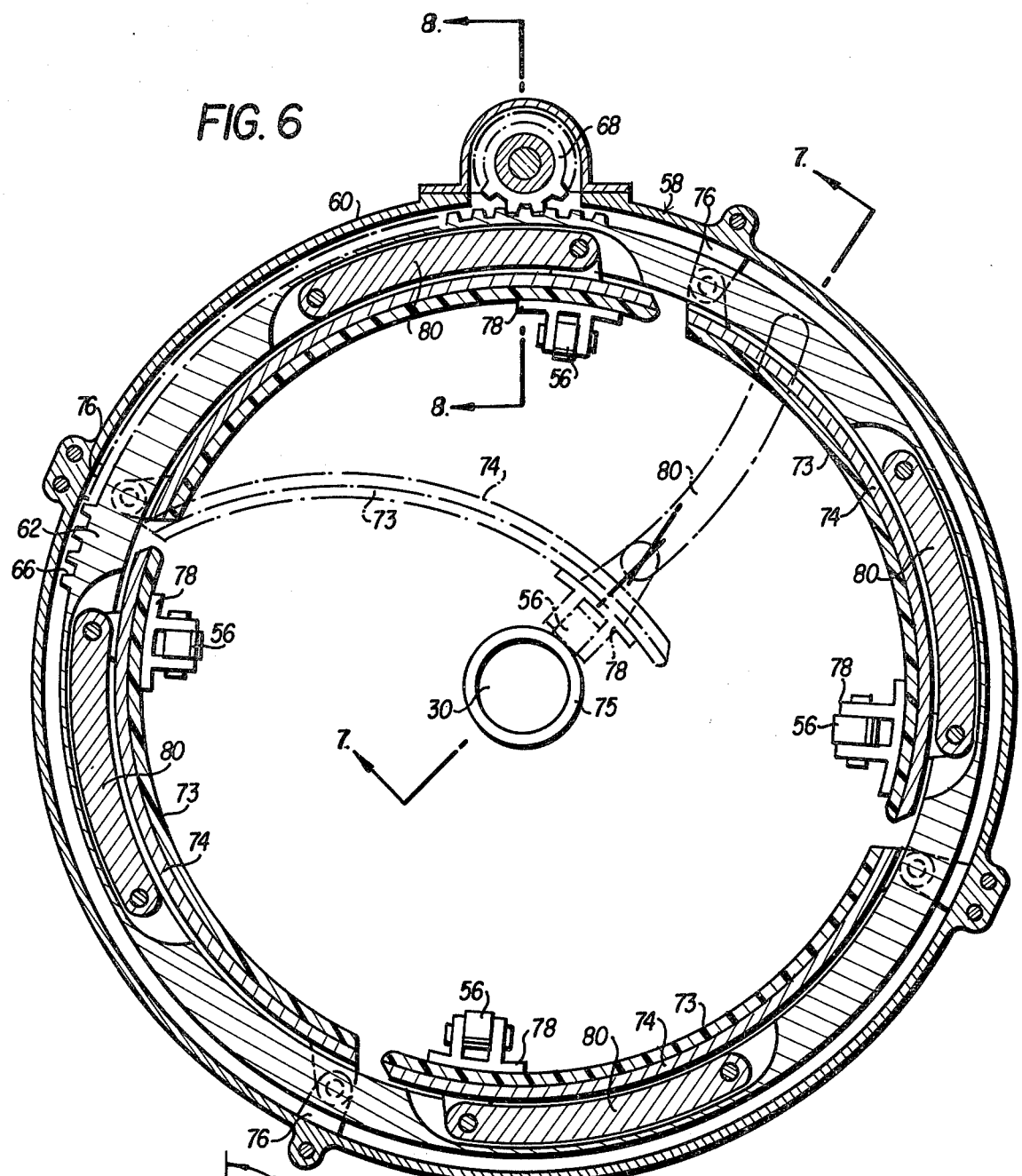
FIG. 6 is a front elevational view of the iris-type adjusting mechanism taken along the line 6—6 of FIG. 2.

Referring now to the drawings where like characters of reference indicate like parts in each of the several views, FIG. 1 depicts a coupling of orbiting space craft such as that envisioned, employing the coupling device of the present invention. The orbital space shuttle 10 has associated with it a remote manipulator system 12 which is capable of removing objects from or returning them to the payload bay 14 of the space shuttle 10. The coupling device 16 of the present invention is connected at one end of the remote manipulator system 12, the other end is shown coupled to an orbiting space craft such as a satellite 18. The movement of the various elements comprising the manipulator system 12 are controlled by the operator inside the orbital space shuttle 10 by remote control and are not a part of this invention.

Referring to FIG. 2, a drive motor 20 is connected between the remote manipulator system 12 and the coupling device 16 of the present invention by means of an adaptor 22. The drive motor 20, preferably electric, can rotate the coupling device 16 to match the direction and rotational velocity of an orbiting payload 24 which it is attempting to deploy or retrieve. The payload 24 is equipped with a broadly situated adaptor ring 26, e.g. a Marmon Clamp Ring secured thereto. The adaptor ring 26 has a radially extending lip 28 around one end thereof which is grasped by the coupling device 16 as will now be discussed.

The coupling device 16 in its broadest aspects consists of a centrally positioned shaft 30 which is substantially axially aligned with a general purpose adaptor 22 and drive motor 20. Mounted on the shaft 30 is fulcrum member 32 for a plurality of manipulator arms 34. The manipulator arms 34, in the preferred embodiment shown, are four in number equally spaced around the fulcrum member at an angle of ninety degrees with respect to adjacent arms. To ensure the required maximum structural rigidity of the entire coupling device 16, the minimum number of manipulator arms 34 is three in number arranged at an angle of one hundred twenty degrees with respect to adjacent arms. The various methods of attachment to the fulcrum member 32 and the movement characteristics of the manipulator arms 34 resulting from each method of attchment will be discussed in greater detail later.

At one end 35 of each of the manipulator arms 34 is rotatably mounted a contact member 36 having an inwardly depending contact element 38 as can best be seen by referring to FIGS. 3, 3A, and 3B. The contact members 36 are moved to a position around the adaptor ring 26 by means of the remote manipulator system 12. In order to absorb any limited radial shock generated during the initial contact of the contact elements 38 with the adaptor ring 26, a torsion spring 40 is provided between the contact member 36 and the manipulator arm 34. The torsion spring 40 biases the contact member 36 away from the longitudinal axis of the manipulator arm 34 at an angle $\theta$ of approximately ten degrees. The torsion spring 40 is held at one of its ends in a slot by means of a bolt 41 in the end 35 of the manipulator arm 34 and by a similar bolt 43 adjacent the end of the contact member 36. An adjustable bolt 37 is provided adjacent the end of the contact member 36 which engages a surface 39 on end 35 and acts to stop the movement of the contact member 36 when it has reached a position of substantial alignment with the longitudinal axis of the manipulator arms 34. Similarly, a fixed projection 37a on contact member 36 limits the movement thereof away from the longitudinal axis of the manipulator arms 34 when it engages manipulator arm end 35. A bumper system is also associated with each contact member 36 consisting of a bumper arm 42 which is secured to a base 44 which in turn is slidably mounted within the contact member 36. The bumper arms 42 may be positioned normal to the longitudinal axis of the contact members 36, i.e. $\alpha = 90°$ as shown in the drawings if the adaptor ring 26 is anticipated to be in substantial axial alignment with the coupling device 16 or the bumper arms 42 may be positioned at an angle $\alpha$ of approximately two degrees greater than the angle $\phi$ of the adaptor 26 relative to the axis of rotation of the coupling device 16 to thereby facilitate coupling. A system of levers 46,48 is rotatably attached at one of their ends to each other and at the other of their ends to the base 44 of bumper arm 42 and the end of the manipulator arm 34 respectively. A link arm 50 is connected at one of its ends to the lever 48 such that movement of the link arm 50 causes the bumper arm 42 to move parallel to contact member 36.

As can be appreciated from FIG. 2 and as will be more fully described later with respect to FIG. 12 and the overall operation of the coupling device 16, the continued motion of the bumper arms 42 against the radially extending lip 28 under the force of links 50 will cause contact elements 38 to move toward the radially extending lip 28 into eventual contact therewith and the desired rigid coupling of the payload 24 to the coupling device 16. A linear spring 51 located within contact member 36 provides pressure on the bumper arm 42 to permit motion from a rearward cocked position. Spring bumpers 45 are provided to ensure that the contact element 38 stays in contact with radially extending lip 28 of the adaptor ring 26. The bumper arm 42 and contact element 38 may have attached thereto a low friction polymer material to provide damping with radially extending lip 28. An adjustable spring stop 51a in the form of a block slidable in contact member 36 is also provided.

Referring now to FIG. 2 and FIG. 4 and the embodiment disclosed therein, the fulcrum member 32 has radially extending recesses 52 in which the manipulator arms 34 are rotatably mounted by means of pins 54. As can be seen, movement of the ends 56 of the manipulator arms 34 toward each other will cause the ends 35 to move away from each other in what is generally referred to as a "negative pliers effect".

FIGS. 5 and 5a disclose another embodiment of fulcrum member 32 wherein one set of oppositely disposed manipulator arms 34a are rotatably mounted with respect to each other on a bolt 54 in shaft 30. The manipulator arms 34a cross through the open center of a pair of parallel, spaced-apart bearings 55. The bearings 55 have an outer portion 55a fixed against rotation to shaft 30 and an inner portion 55b which rotates on balls 55c with respect to the outer portion 55a. A second set of oppositely disposed manipulator arms 34b are secured to the inner portion 55b of each bearing. If the ends 56 of the manipulator arms 34a and 34b are moved toward each other by the iris mechanism, as will be described shortly, the ends 35 of the manipulator arms 34a and 34b will also move toward each other in the nature of a conventional pair of pliers. This is commonly referred to as the "positive pliers effect".

If the force moving the ends 56 toward each other increases as the ends 56 approach each other, as is the case with the present iris adjusting mechanism as will be more fully described later, the choice of whether to use the embodiment of FIG. 4 or 5 will depend on whether this increasing force is desired to be transmitted to the manipulator arm ends 35 in motion toward each other or away from each other. In the preferred embodiment, it is desirable to have the contact elements 38 engage the adaptor ring 26 with a minimum amount of force so as not to cause structural damage thereto and have maximum amount of force as the ends 35 move away from each other to effect cocking of the bumper actuating means to be described shortly. If, however, the only use of the coupling device 16 is to grasp and hold an object tightly between the ends 35, then the embodiment of FIG. 5 would be preferable.

The means utilized to move the ends 56 of the manipulator arms toward each other is an iris mechanism 58 mounted coaxially with the shaft 30 and secured to adaptor 22. This iris mechanism 58, as shown in FIGS. 6–10, consists of a cylindrical shaped housing 60 which is secured to the adaptor 22. A driving ring 62 is concentrically mounted within the housing 60 on bearings 64. The driving ring 62 has a gear segment 66 around a portion of the outside periphery thereof which is in driving engagement with a spur gear 68. The spur gear 68 is in turn driven by a motor 70 preferably electric, mounted on the outside of the housing 60. The bearings 64 are held in position adjacent the driving ring 62 by means of bearing retainer elements 72. A plurality of crescent-shaped blades 74 are journaled for rotation at one end thereof to a bracket 76 formed integrally with the inside surface of housing 60. The blades 74 have a frictional surface contact member 73 applied to its outer surface. As aforementioned in the preferred embodiment of the invention wherein four manipulator arms 34 are employed, there are four blades 74 connected to brackets 76 which are positioned at an angle of ninety degrees with respect to each other. Connected adjacent the other end of each blade 74 is one part of a knuckle-type coupling element 78, the other part thereof is connected to the ends 56 of the manipulator arms 34. The coupling element 78 permits a degree of rotation of the manipulator arm ends 56 with respect to the blades 74.

Figure 9:
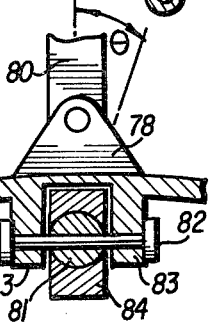
FIG. 9 is a cross-sectional view taken along the lines 9—9 of FIG. 7.
Figure 10:
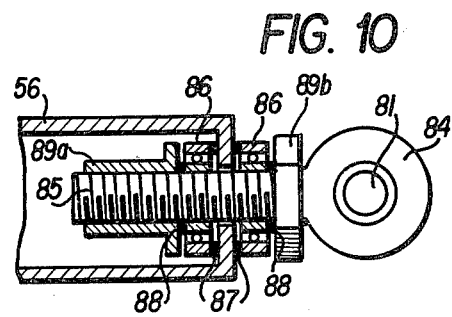
FIG. 10 is a side elevational view of another embodiment of the coupling element.

FIG. 9 shows one embodiment of the coupling element 78 wherein a ball 81 is held by means of a bolt 82 between depending ears 83. A socket head 84 fits over the ball 81 and is self-aligning therewith thru $\theta$ shown. The socket head 84 has a threaded end which is secured to the end 56 of each manipulator arm 34 to permit linear adjustment therebetween. As can be appreciated by referring briefly to FIG. 6, when the iris blades 74 are moved between their retracted and extended positions, the coupling element 78 is rotated gradually to a certain extent. If the ends 56 of the manipulator arms were fixed to the blades 74 against rotation, the resultant twisting of the manipulator arms 34 would result in their damage. The socket head 84 of the coupling device, however, permits the ends 56 of oppositely disposed manipulator arms 34 to remain in the same plane as the ball 81 of the coupling element 78 is rotated. A second embodiment of the coupling element 78 is shown in FIG. 10 employing the same self aligning ball 81 and socket 84 combination of the embodiment of FIG. 9, however, the threaded end 85 is also permitted to rotate with respect to the end 56 of the manipulator arm 34. This relative rotation is achieved by means of the use of angular contact bearings 86 arranged on either side of a radially extending flange 87 on the end 56 of the manipulator arm. Washers 88 are positioned (as shown) relative to the inner and outer races of the bearings 86, the end 56 of the manipulator arm and securing nuts 89a, and 89b to permit rotation of the threaded end 85 with respect to the end 56 of the manipulator arm 34.

The blades 74 are also connected by means of a link 80 to the driving ring 62. One end of the link 80 is rotatably secured to the blade 74 at a point substantially adjacent the coupling element 78 and the other end thereof is rotatably secured to the driving ring 62. In the first or open position of iris mechanism 58, the blades 74 rest adjacent the inside surface of the housing 60 and the spur gear 68 is at one end of the gear segment 66. As the spur gear 68 and gear segment 66 are caused to rotate by motor 70, the links 80 cause the blades 74 to begin to move inwardly toward each other with an initial force. As the ring 62 continues to rotate, the blades 74 approach each other with gradually increasing force due to the corresponding increase in mechanical advantage resulting from the connecting link 80 and its position relative to the driving ring 62 and the end of blade 74. At the end of travel of the spur gear 68 relative to the gear segment 66, the maximum mechanical advantage has been achieved and the corresponding force capable of being exerted by the blades 74, which are now in their maximum extended position, is the greatest. A stop 75 on shaft 30 is engaged by the coupling element 78 to stop the inward travel of the blades 74. As can be seen therefore, as the driving ring 62 is rotated, the blades 74 of the iris mechanism 58 cause the contact members 36 of the coupling device to move toward or away from each other. The use of one or the other of the embodiments of the fulcrum member 32, as aforementioned, will determine whether the maximum force generated by the iris blades 74 in their inwardmost position is transmitted to the contact members 36 when they approach each other or move away from each other. As previously mentioned in the present embodiment of the invention disclosed, the manipulator arms 34 are arranged with respect to each other at the fulcrum 32 to provide a negative pliers effect. Thus, when the blades 74 of the iris mechanism are approaching each other and exerting their maximum force, the portion of the manipulator arms 34 between the fulcrum 32 and contact members 36 are moving away from each other with a corresponding maximum force. This maximum force is used to cock an actuating mechanism referred to generally by numeral 90 in FIG. 2 and which will now be described.

Figure 11:
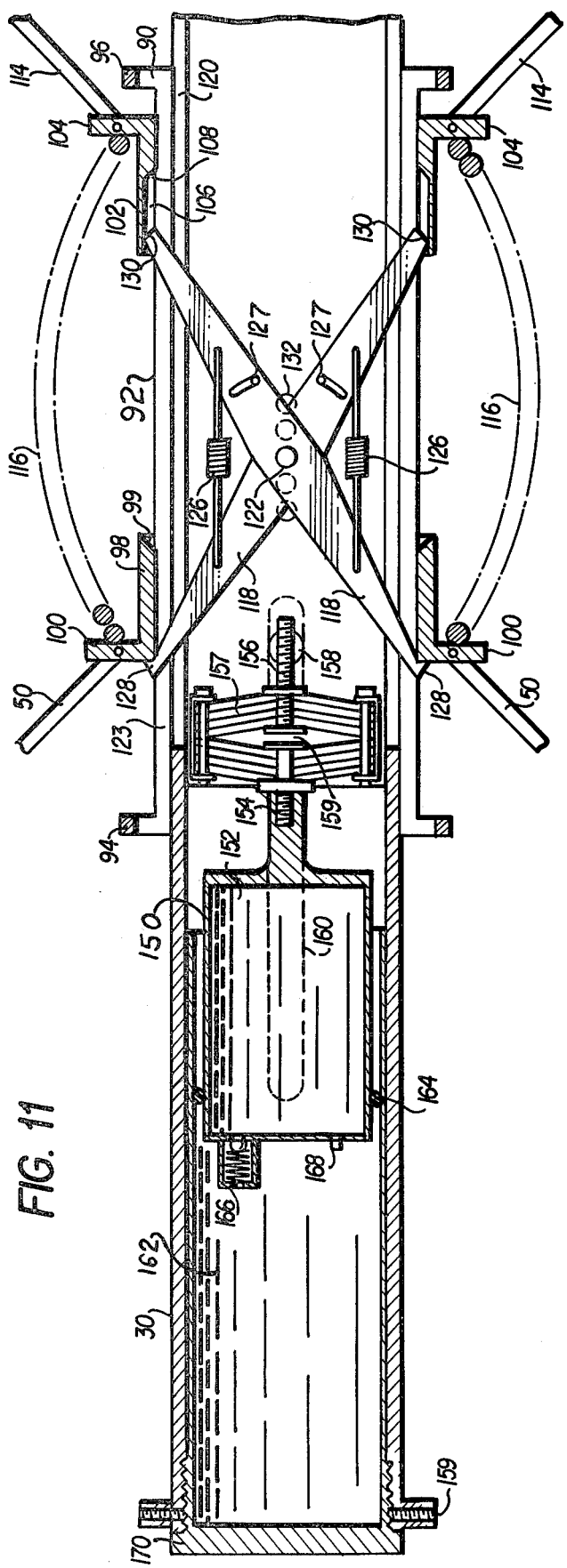
FIG. 11 is a side elevational view in partial cross-section of the bumper actuating mechanism.

Referring to FIGS. 2 and 11, the actuator mechanism 90 consists of an actuator support element 92 in the form of a cylindrical-shaped bobbin which is concentric with and slidably mounted on shaft 30. The support element has radially extending ends 94,96 which act as stops. Slidably mounted on and concentric with the actuator support element 92 is a first link support 98 having a radially extending flange 100 and a spaced apart second link support 102 having a corresponding radially extending flange 104. The first link support has a beveled edge 99 adjacent the end thereof. The second link support 102 has an inward, radially extending recess 106 which terminates in a beveled surface 108 the purpose of which will be more fully described later. The first link support 98 is rotatably connected to each lever 48 by means of the link arm 50. The length of the link arm 50 can be adjusted by means of a turnbuckle-type mechanism 112. Correspondingly, the second link support 102 is connected to each manipulator arm 34 by means of a link arm 114. A plurality of positions 115 are provided on manipulator arm 34 to vary the location of the end of link arm 114. A coiled compression spring 116 extends around the first and second link supports 98, 102 and between the respective flanges thereof 100,104. As can be seen, as the manipulator arms 34 are moved toward each other by the iris mechanism 58, the movement is transmitted to the link arms 50 by means of the compression spring 116. Further, as the manipulator arms 34 are caused to move away from each other by the iris mechanism 58, the link support 102 slides into engagement with the end of actuator support element 92. Continued movement by the manipulator arm 34 causes end 94 of the actuator support element to engage flange 100 compressing coil spring 116 into a cocked position.

In order to maintain the actuator mechanism in this cocked position, a pair of latching arms 118 are rotatably mounted in a recess 120 in the shaft 30 by means of a pin 122 and extend through a recess 123 in the actuator support element 92. A pair of tension springs 126 bias the arms 118 against stop pins 127. The latching arms 118 have a trigger 128 on one end thereof which, in the cocked position, as shown in FIG. 11, engages and holds the first link support. The other end 130 is beveled and rests in recess 106 against the second link support 102. In the cocked position as aforementioned, the manipulator arms 34 and thus the contact members 36 and corresponding contact elements 38 are at their maximum, spaced apart position away from the adaptor ring 26.

As the iris mechanism 58 moves the contact elements 38 toward the adaptor ring 26, the link arm 114 causes second link support 102 to move to the left as viewed in FIG. 11. Continued movement causes engagement of the beveled edges 108, 130 and a camming of the ends of the latching arms 118 toward each other thus releasing the first link support 98 from trigger 128. As the link support 98 in turn moves to the left, as viewed in FIG. 11, under the force of compression spring 116, link arm 50 moves levers 46,48 thus causing the bumper arms 42 to move with respect to contact members 36 until the bumper arms 42 engage the radially extending lip 28 of the adaptor ring 26. Continued movement of the bumper arms 42 causes the contact elements 38 to also engage the lip 28 and hold it and the payload 24 secure. In order to ensure that the latching trigger 128 release the first link support element 98 at the proper time, i.e. when the contact element 38 is substantially adjacent the adaptor ring 26, the point where the beveled edges 130 pass from within the recess 120 is controlled by relocating the pin 122 in one of the adjacent recesses 132 through shaft 30 which, in turn, shifts the location of the latching arms 118 relative to the first and second link support elements 98,102.

In order to reduce the speed of engagement of the bumper arms 42 with the radially extending lip 28, a damper mechanism 150 is provided in the form of an insertable cartridge. The damper 150 consists of a hollow piston 152 slidably positioned in the end of shaft 30 adjacent the actuator mechanism 90. At one end, the piston 152 is connected by means of a threaded shaft 154 to Belleville spring 157 which, in turn, is connected by a threaded shaft 156 to a transverse shaft 158 connected to first link support element 98. A longitudinal slot 160 is provided in the wall of shaft 30 to permit sliding movement of the shaft 158. The action of the damper 150 occurs through compression or tension of the springs 157 from the transverse shaft 158 which is actuated to the right or left as viewed in FIG. 11. A sufficient gap 159 is provided to additionally relieve oscillatory motions of the actuating mechanism 90 and to allow for relief of any tendencies to misalign the action of the damper. The medium for restriction is a fluid 162 which is contained by means of an "O" ring seal 164 between the inside wall of the shaft 30 and the piston 152. A check valve 166 and an orifice 168 are provided in the other end of the piston 152. The orifice 168 permits the fluid 162 to enter the inside of the piston at a predetermined rate upon release of the first link support element 98 to thereby control the linear rate of movement of the first link support 98 and the bumper arms 42. During this movement of the piston 152, the check valve 166 is closed. The check valve 166, however, is open during recocking of the actuator mechanism to minimize resistance to the passage of the fluid from the inside of the piston 152. A nut 170 closes the end of shaft 30 and holds cartridge damper 150 therein.

Figure 12D:
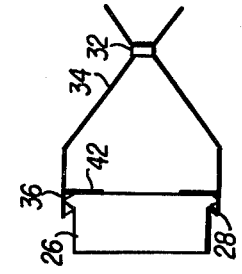
FIGS. 12 (a)—(d) are schematic illustrations of a typical grasping, aligning and engaging operation of the coupling device and an adaptor ring.
Figure 12C:
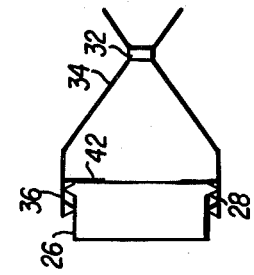
Figure 12B:
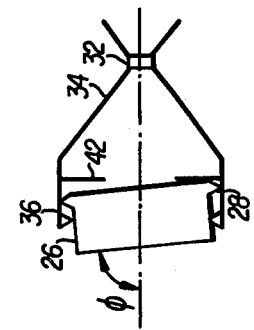
Figure 12A:
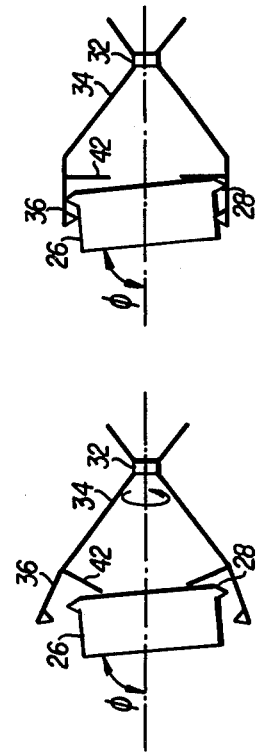

Referring now to FIGS. 2 and 12a—d, a schematic diagram illustrates the operation of the coupling device 16. In FIG. 12a the orbital payload 24 is shown rotating slowly and at an angle $\phi$ with respect to the longitudinal axis of the coupling device 16 which has been maneuvered to a position in the path of the payload 24. The contact members 36 are at their greatest spaced apart position as they are extended around the adaptor ring 26 and are caused to rotate by the motor 20 in the same direction and at the approximate speed of the adaptor ring 26. The iris mechanism 58 is then actuated causing the contact elements 38 of the contact members 36 to engage the adaptor ring 26 as shown in FIG. 12b. The position of the manipulator arms 34 as this contact position is approached will cause unlatching of the actuator mechanism 90 as previously described. As the actuator mechanism 90 moves the bumper arms 42 toward the lip 28 of the adaptor ring 26 as restricted by the damper mechanism 150 (FIG. 11), the bumper arms 42 engage the lip 28 and slowly rotate same until the adaptor ring and lip 26,28 are axially aligned with the coupling device 16 as shown in FIG. 12c. Continued movement by the bumper arms 42 forces the contact elements 38 into final secure engagement against the lip 28 of the adaptor ring 26 as shown in FIG. 12d. The remote manipulator system can now maneuver for example the payload into the payload bay of the orbital space shuttle.

The coupling device of present invention as just described in detail could, of course, be used on the end of any remote type manipulator arm such as, for example, those used in handling radioactive materials or in undersea activities.

What is claimed is:

1. A device for the coupling of a first vehicle to a second vehicle moving relative thereto, said second vehicle having an annular means adapted to be engaged by said coupling device carried by said first vehicle, said device comprising:

(a) at least three contact members arranged relative to each other for engaging said annular means, (b) at least three manipulator arms, each manipulator arm operatively connected at one end thereof to one of said contact members, each of said manipulator arms being rotatably mounted adjacent a shaft carried by said first vehicle, (c) means positioned on said shaft adjacent a second end on each of said manipulator arms for controlling the movement of said second ends to a first position wherein said movement of said second ends to said first position causes said contact members to move toward each other into engagement with said annular means on said second vehicle and wherein said movement of said second ends to a second position causes said contact members to part and to disengage said annular means on said second vehicle, (d) bumper means mounted adjacent said one ends of said manipulator arms for engaging said annular means on said second vehicle, and (e) actuator means mounted on said shaft and operatively connected to said bumper means by bumper link means such that upon actuation of said actuator means said bumper means causes said annular means to move into axial alignment with said shaft.

2. A device as set forth in claim 1 wherein said actuator means is further operatively connected to said manipulator arms by manipulator arm link means such that, upon movement of said second ends of said manipulator arms to said second position said actuator means is moved to a cocked position by said manipulator arm link means.

3. A device as set forth in claim 2 wherein said actuator means further comprises:
(a) actuator support means slidably mounted on said shaft,
(b) first and second oppositely disposed link support means slidably mounted on said actuator support means, said first link support means being operatively connected to said manipulator arm link means and said second link support means being operatively connected to said bumper link means,
(c) compression spring means positioned between said first and second link support means, and
(d) latch means mounted on said shaft means for maintaining said first and second link support means in a position relative to each other when said link support means are being biased away from each other by said compression spring means.

4. A device as set forth in claim 3 wherein said latch means comprises a pair of latch elements rotatably mounted in said shaft, said latch elements having a trigger on one end thereof for engaging said second link support means each of said latch elements having another end thereof in engagement with said first link support means such that motion of said first link support means upon release thereof toward said second link support means causes said trigger ends of said latch elements to disengage from said second link support means permitting movement thereof away from said first link support means.

5. A device as set forth in claim 1 wherein said actuator means further comprises damper means for gradually reducing the engagement speed between said bumper means and said annular means.

6. A device as set forth in claim 5 wherein said damper means comprises:
(a) hollow piston means slidable in said shaft and operatively connected at one end thereof to said actuator means,
(b) fluid means adjacent a second end of said hollow piston means, and
(c) orifice means through said second end of said hollow piston means to permit said fluid to gradually enter said hollow piston means to provide a dampening effect when said hollow piston means is moved in a first direction by said actuator means.

7. A device as set forth in claim 6 wherein said hollow piston means includes a check valve in said second end of said hollow piston means to facilitate movement of said fluid means out of said hollow piston means when said hollow piston means is moved in a second direction by said actuator means.

8. A device as set forth in claim 7 wherein said damper means further comprises Belleville spring means connected between said hollow piston means and said actuator means to relieve oscillatory motion therebetween.

9. A device as set forth in claim 1 further comprising:
(a) torsional spring means connected between each of said manipulator arms and said contact members to provide radial shock absorption in the outward direction during coupling operations, and
(b) linear spring means connected between elements of each of said bumper means to provide a means for smooth release from a cocked position in an axial direction during said coupling operation.

10. A device as set forth in claim 1 wherein said movement controlling means is an iris-type adjusting mechanism.

11. A device as set forth in claim 10 wherein said iris type adjusting mechanism comprises:
(a) a cylindrical shaped housing having at least three blades rotatably mounted at one end thereof on the inside of said housing,
(b) means on said blades for connecting said blades to said second ends of said manipulator arms,
(c) a motor driven ring gear rotatably mounted in said cylindrical shaped housing adjacent said blades, and
(d) link means operatively connected at one end thereof to said ring gear and connected at a second end thereof to a second end of said blades such that upon rotation of said motor driven ring gear, said link means causes said second ends of said blades as well as said second ends of said manipulator arms to move toward each other.

12. A device as set forth in claim 11 wherein said means for connecting said blades to said manipulator arms are self-aligning ball joints.

13. A device as set forth in claim 1 further comprising means operatively connected to said shaft for rotating said contact members at the same rotational speed as that of said second vehicle.

14. A device as set forth in claim 1 wherein said movement of said second ends of said manipulator arms to said first position is away from each other and to said second position is toward each other.

15. A device as set forth in claim 1 wherein said movement of said second ends of said manipulator arms to said first position is toward each other and to said second position is away from each other.

* * * * *